United States Patent [19]

Dieudonne et al.

[11] Patent Number: 5,818,837
[45] Date of Patent: Oct. 6, 1998

[54] ATM CELL SWITCHING NETWORK

[75] Inventors: Marc Dieudonne, Igny, France; Lothar Katzschner, Stuttgart, Germany

[73] Assignee: Alcatel N.V., Rijswijk, Netherlands

[21] Appl. No.: 675,624

[22] Filed: Jul. 3, 1996

[30] Foreign Application Priority Data

Jul. 7, 1995 [FR] France ................................... 95 08253

[51] Int. Cl.[6] .................................................. H04L 12/56
[52] U.S. Cl. .......................................... 370/389; 370/395
[58] Field of Search ..................................... 370/389, 369, 370/370, 371, 372, 375, 367, 377, 376, 380, 387, 237, 381, 383, 388, 394, 393, 395, 412, 413, 414, 415, 416, 417, 448, 428, 432

[56] References Cited

U.S. PATENT DOCUMENTS

| 5,272,696 | 12/1993 | Mantez et al. | 370/394 |
| 5,311,509 | 5/1994 | Heddles et al. | 370/397 |
| 5,355,372 | 10/1994 | Sengupta et al. | 370/367 |
| 5,388,266 | 2/1995 | Frey et al. | 395/700 |

FOREIGN PATENT DOCUMENTS

0602693A2  6/1994  European Pat. Off. .
2570914A1  3/1986  France .

OTHER PUBLICATIONS

H. Saidi et al, "Guaranteed Cell Sequence in Nonblocking Multi-channel Swithching", *IEEE Infocom '94 The Conference On Computer Communications*, 12 Jun. 1994, pp. 1420–1427.

L. Nederlof et al, "A New Distributed Restoration Algorithm to Protect ATM Meshed Networks Against Link and Node Failures", *ISS '95 International Switching Symposium 1995*, Apr. 23, 1995, Berlin, pp. 398–402.

*Primary Examiner*—Dang Ton
*Attorney, Agent, or Firm*—Sughrue, Mion, Zinn, Macpeak & Seas, PLLC

[57] ABSTRACT

A switching network for switching data in the form of cells transmitted in asynchronous transfer mode is of the "multiple path, cell auto-routing and directed sub-connection" type. Detectors are provided at each output port of the switching network to detect the absence of a missing cell in a call using that output. Incident registers store in response thereto an incident indication signifying that a cell is missing and indicating the path that the missing cell must have taken from path data derived from another cell of the same call.

8 Claims, 4 Drawing Sheets

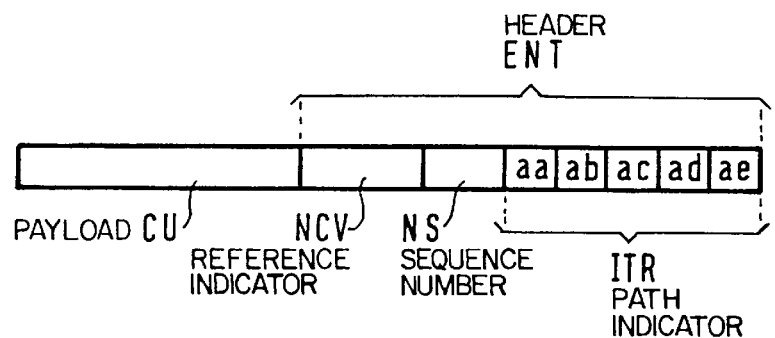
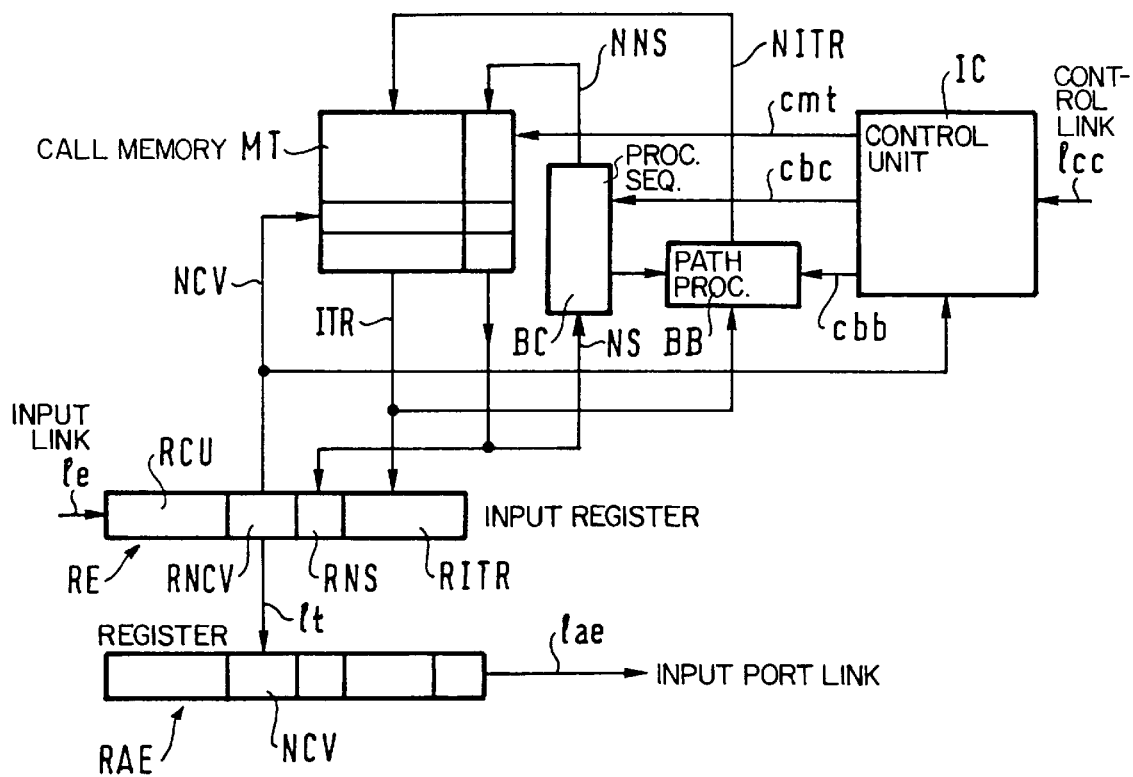

ATM CELL SWITCHING NETWORK

BACKGROUND OF THE INVENTION

1. Field of the invention

The present invention concerns a switching network for switching data in the form of cells transmitted in asynchronous transfer mode (ATM), also referred to as time-division multiplexing, the network being of the "multiple path cell auto-routing" type.

2. Description of the prior art

In switching networks of this kind, and for the duration of a call, cells separated by intervals that are usually variable must be routed from an input port to an output port, enabling transfer of data between a send terminal connected to the input port and a receive terminal connected to the output port. The network sets up a multiplicity of such calls at all times. To this end the switching network includes switches that are usually arranged in several stages. The input ports are connected to the switch input ports of a first stage, the output ports are connected to the switch output ports of an output stage and the output ports of the input stage switches are connected to the input ports of the output stage switches by switches of one or more intermediate stages. A switching network of this kind is called a "multiple path" network when there are several possible paths between any input port and any output port. A switching network of this kind is called a "cell auto-routing" network when each cell of the same connection is routed autonomously using path information contained in the cell and that itself defines the destination of the cell in each stage of the switching network.

Provided that the cells of the same call are uniformly distributed across the possible paths, the advantage of switching networks of this latter type is that the overall cell traffic can be uniformly distributed in the network and that blocking as the result of congestions of cells in a part of the switching network can be significantly reduced or even totally eliminated.

However, a drawback of a switching network of this type is that the faulty element is difficult to identify in the event of a failure in the network affecting only some of the cells passing through the faulty element of the switching network. Maintenance is difficult and requires specific and therefore costly measures.

U.S. patent application Ser. No. 08/565105 of 30 Nov., 1995 describes a switching network of this type in which the cells of the same call are uniformly distributed between the possible paths and, in the transmission of the successive cells of the same call over N possible paths:

the N possible paths for the cells of that call are determined,

N sub-connections corresponding to the N possible paths are set up, the cells of the call are systematically distributed uniformly between the N sub-connections set up, and the cells routed by these N sub-connections are then assembled.

In what follows a switching network of this kind is referred to as a "directed sub-connection" network.

A network of this kind also suffers from the drawback mentioned above.

SUMMARY OF THE INVENTION

The invention therefore consists in a switching network for switching data in the form of cells transmitted in asynchronous transfer mode, said network being of the "multiple path, cell auto-routing and directed sub-connection" type, including detector means at each output port of said switching network to detect the absence of a missing cell in a call using that output and incident register means for storing in response thereto an incident indication signifying that a cell is missing and indicating the path that said missing cell must have taken from path data derived from another cell of the same call.

Advantageously, said path data was supplied by an earlier cell of the same call before it was realized that a cell of that call was missing, said detector means comprising memory means adapted to store said path data at the time of transmission of said earlier cell and to restore it at the time of transmission of an incoming cell in order that it constitute said path data in said incident indication.

In one embodiment, said path data is provided by a cell of the same call available at the time it is realized that a cell of that call is missing and constitutes said path data in said incident indication.

If the switching network is adapted to preserve the sequence of the cells, i.e. to supply to an output port the cells of a call in the order in which those cells arrive at an input port, either by preserving the sequence by controlled routing of the cells in the switches of the various stages of the network, or by restoring this sequence at each output port using resequencing means, the sequence number of an incoming cell is simply compared with that of the preceding cell of the call in question. That sequence number must have increased by one unit over the preceding number. Otherwise it is presumed that a cell is missing.

In one embodiment, said detector means comprise memory means adapted to store said sequence number at the time of transmission of an earlier cell of a given call and for restoring it at the time of transmitting an incoming cell of the call in question and means for comparing said earlier cell sequence number and said incoming cell sequence number on the assumption that a cell is missing if said sequence number of said incoming cell is not the same as that of said preceding cell increased by a constant.

In one embodiment, each input port comprises sequencer means that allocate a sequence number to each cell of the same call and insert it in the path data of that cell and path processor means writing into each cell a path choice value indicating which path from a plurality of possible paths said cell must take.

Additionally, each switch of said switching network comprises means operative when in the context of a broadcast call the routing to be imparted by said switch to an incoming cell requires recourse to a broadcast path memory supplying routing data in order to enter said routing data into said path indicator.

The invention applies equally to broadcast calls and to point-to-point calls.

The various objects and features of the present invention will emerge more clearly from the following description of embodiments of the invention given by way of non-limiting example with reference to the appended drawings.

BRIEF DESCRIPTION OF THE DRAWINGS

FIG. 2 shows a cell routed in the FIG. 1 switching network.

FIG. 3 shows the means provided in an access unit (uae) shown in FIG. 1 for preparing cells as shown in FIG. 2.

DETAILED DESCRIPTION OF THE PREFERRED EMBODIMENT

Figure 1:
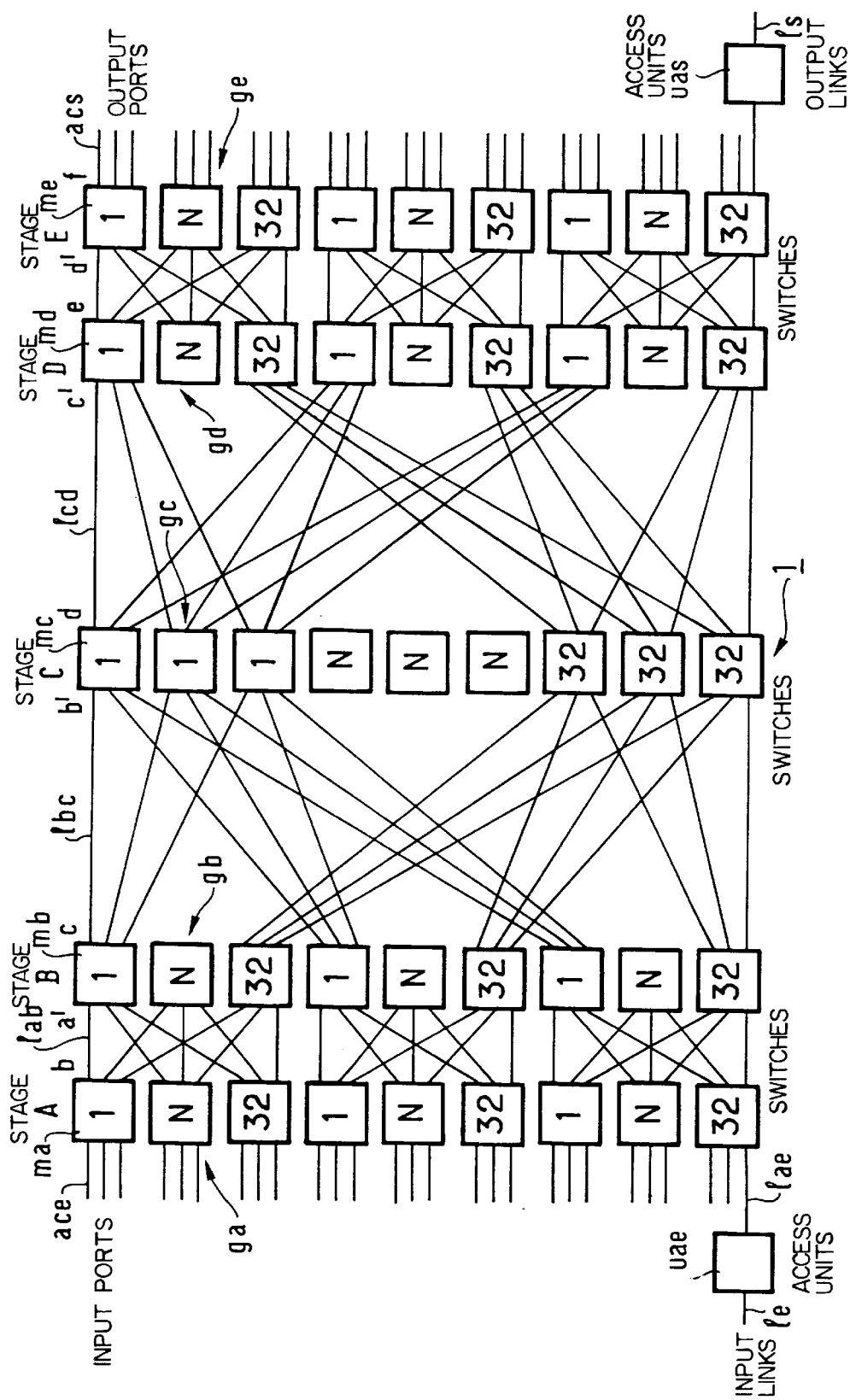
FIG. 1 is a diagram of the links of a switching network to which the present invention may be applied.

FIG. 1 shows a switching network 1 for switching data in the form of cells transmitted in asynchronous transfer mode (ATM), this network being of the "multiple path, cell auto-routing and directed sub-connection" type.

It includes input ports ace, etc, switches ma, etc of a stage A, switches mb, etc of a stage B, switches mc, etc of a stage C, switches md, etc of a stage D, switches me, etc of a stage E and output ports acs, etc.

Each switch is represented by a rectangle containing a number, 1, N or 32. In the vertical direction, the consecutive switches numbered 1, N, 32 illustrate a group of 32 similar switches. Thus the figure shows, in the stage A, groups of 32 switches ga, etc arranged vertically. The input ports of the switches, on the left-hand side in the figure, which also constitute the input ports of the switching network 1, are connected to input links le, etc equipped with access units uae, etc each connected to an input access port belonging to it by an input access link lae. Each switch has 32 input ports and 32 output ports, for example.

The figure also shows, in the stage B, just as in the stage A, groups of 32 switches gb, etc arranged vertically. The links lab, etc between the stage A and the stage B are arranged separately, in each case between a group of 32 switches of the stage A and a group of 32 switches of the stage B, for example the groups ga and gb. To be more precise, each output of each switch of the stage A is coupled by a link to a different switch of the stage B and, likewise, each input of each switch of the stage B is coupled by a link to a different switch of the stage A, within two associated groups such as the groups ga and gb.

The symmetrical but otherwise identical arrangement is found in the stages E and D, in which groups such as ge and gd are homologs of the groups ga and gb.

These groups of switches of the stages B and D are interconnected by the stage C, the switches of which are arranged in sets gc, etc, each set comprising 32 switches, for example, equal in number to the output ports of each switch of the stage B. The switches of a set all carry the same number, the number 1 in the case of the switches of the set gc. Sets of switches with the numbers N and 32 are shown to indicate that there are 32 sets. The 32 switches "1" of the stage C interconnect the combination of the 32 switches "1" of the stage B with the set of the 32 switches "1" of the stage D. To be more precise, each output of each switch "1" of the stage B is coupled by a link lbc, etc to a different switch "1" of the stage C and, likewise, each input of each switch of the stage C is coupled by a similar link to a different switch "1" of the stage B. Similar links lcd, etc are provided between the switches "1" of the stage C and the switches "1" of the stage D. The same applies to the other sets.

It is therefore clear that a cell reaching the input port ace of the switch ma of the stage A can be routed to the output port acs of the switch me of the stage E by any one of the 32 switches of the group gb, any one of the 32×32 switches of the stage C and one of the switches of the group gd. Note that the identity of the latter is defined as soon as that of the switch of the stage C is defined. This means no less clearly that each cell therefore has 32×32=1 024 paths. In the patent application mentioned earlier, 1 024 sub-connections correspond to these 1 024 paths and these 1 024 sub-connections are used cyclically to route the successive cells of the call in question. The same applies to all the simultaneous calls, with the result that the throughputs of cells of all the calls in progress are mixed in the switching network and the throughput of cells through each switch is a fraction of the overall throughput routed by the switching network, the same for each of them, which avoids any congestion.

The output ports of the switching network are each provided with an output access unit uas, etc leading to an output link ls.

FIG. 1 naturally constitutes a very specific example of a switching network, to give a firm idea of the principle of the invention, and it is well known in this art that many variants are possible, for example the provision of switches having a greater or lesser number of inputs and outputs, rectangular switches to reduce the loading of the links and switches disposed at the center of the switching network, a plurality of links between a given two switches rather than a single link, etc.

The routing of the cells of a call is determined by the access unit uae, etc of the input port through which the call is set up. The means employed to this end are those described in the patent application previously mentioned.

Those means, contained in the input access unit uae, enable successive cells corresponding for example to the format shown in FIG. 2 to be constructed on the basis of the information received over the link le, regardless of the format of the data.

The cell shown in FIG. 2 therefore comprises a header ENT followed by a payload CU containing the call data proper. The header ENT includes (amongst other data that is not shown) a path indicator ITR, a sequence number NS and a reference indicator NCV.

The path indicator ITR corresponds to one of the available sub-connections for each cell of the same call. In fact it defines that sub-connection completely by specifying the identity of the output to which the cell reaching this switch must be forwarded by means of values aa, ab, ac, ad, ae, each addressed to a switch of each of the stages A through E. In the example shown, in which the switches have 32 outputs, each of these values is a 5-bit binary number.

The sequence number NS is a binary number of a few bits (five bits, for example) which assumes the various possible values of this number cyclically in the successive cells of the same call. It provides an easy way of monitoring the order of arrival of the cells at the output port of the switching network and detecting if any are missing.

The reference indicator NCV identifies the call. It is allocated by a call control device that is not described further in this application as it is outside the scope of the present invention. One situation in which it is used is that of a broadcast call, from one point to several points, from one input port to several output ports. It is then used in some switches of the switching network to supply the identity of the output(s) of the switch to which the cells must be forwarded, using path data previously distributed to the switches. This aspect of switching in the switching network is discussed further below.

Turn now to FIG. 3, which shows one embodiment of the FIG. 1 access unit uae which receives input cells and prepares cells as shown in FIG. 2.

The input link le is connected to an input register RE. For each input cell the input link le supplies at least a payload CU and a call reference indicator NCV. The payload is placed in the RCU part of the register RE. The reference indicator is placed in the RNCV part of the register RE. At the same time this reference indicator is used as an address to read a call memory MT having one storage location for each call. The address location is read to obtain a sequence number NS that is placed in a location RNS in the register RE and a path indication ITR that is placed in a location RITR in the register RE. The sequence number NS is also supplied to a sequence processor unit BC that uses a sequencing algorithm to produce a new sequence number NNS. The sequence algorithm can simply consist in adding one unit modulo $2^s$ where s is the number of bits in the number NS. The path indicator ITR is also passed to a path processor unit BB that uses a path algorithm to produce a new path indicator NITR. Building on the previous example, this algorithm may consist in adding one unit modulo NT to a path choice value obtained by combining the values aa and ab of the cell from FIG. 2, which it will be remembered each comprise five bits and each identify the output port to be used, in the switch of the stage A, in the case of the first, and in the switch of the stage B, in the case of the second. These two values combined represent the identity of one of the matrices of the stage C, i.e. the identity of one of the 1 024 possible paths for any point-to-point connection in the FIG. 1 switching network. In this case, the value of NT is naturally $2^{10}=1\ 024$. The other values of the indicator ITR that identify the output to which the cell is addressed obviously remain unchanged.

The new sequence number NNS and the new path indicator NITR are supplied to one input of the memory MT and the read operation just mentioned is followed by a write operation to write NNS and NITR into the same memory location, where they become NS and ITR for the next cell of the same call, the address NCV remaining unchanged.

At this time the content of the register RE is transferred into the register RAE over a link lt after which it is supplied to the input port link lae (see also FIG. 1). The register RE then becomes available to receive the next cell of the same or another call.

The input access unit in FIG. 3 further includes a control unit IC which receives data defining the calls to be set up from a call control unit that is not shown as it does not form part of the invention, as previously mentioned. This data is sent to it over a control link lcc and essentially comprises data to be written into the memory MT over the link cmt and at an address corresponding to a call reference indicator (NCV), this data constituting a path indicator ITR and comprising (see also FIG. 2) predetermined values aa and ab and a set of values ac, ad, ae identifying an output of the switching network to which the cells of the call in question must be sent.

The control unit IC also times the operation of the memory MT and of the units BC and BB over the links cmt, cbc and cbb.

The foregoing implicitly concerns a point-to-point call.

In the case of a point-to-multipoint call, as already mentioned, the path indicator ITR is partially absent from the cells of a broadcast call routed in the network, at the time they are introduced into an input port of the stage A. It is the reference indicator NCV which, translated in some of the switches receiving a cell of this kind, defines to which output port(s) of the switch the cell must be forwarded. The role of the FIG. 3 unit can then be exactly the same as that just described, except that the control unit IC writes into the memory MT a conventional value for the part of the indicator ITR (see FIG. 2) that corresponds to the values ac, ad, ae.

Figure 4:
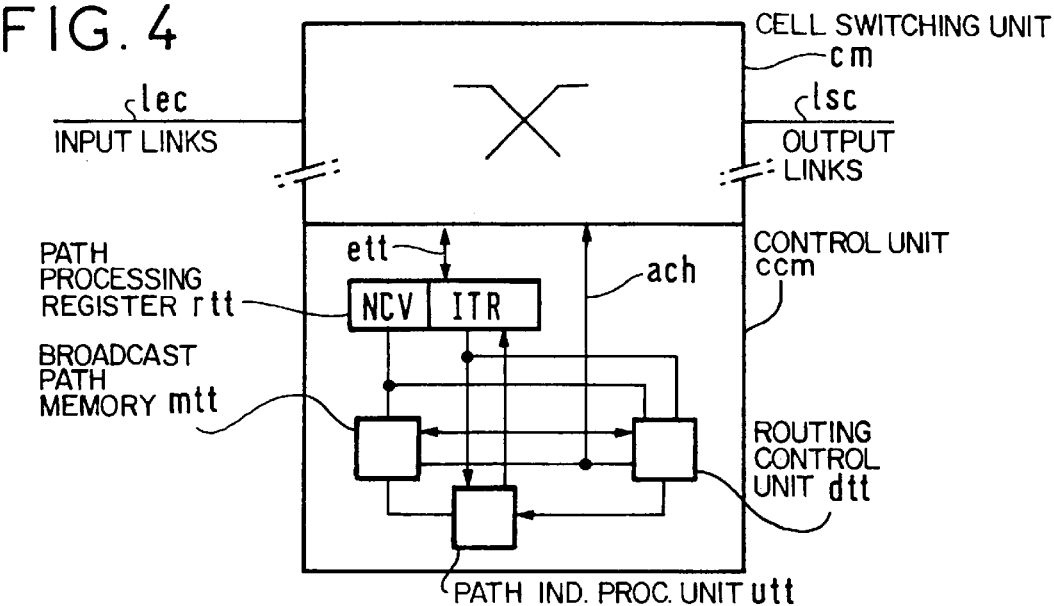
FIG. 4 shows the path marker means provided in each of the switches of the FIG. 1 switching network for writing into each cell routing data indicating what path the cell has taken, in the case of a broadcast connection.

Turn now to FIG. 4 which is a diagram showing path marker means provided in each of the switches of the FIG. 1 switching network for writing into each cell routing data indicating the path that the cell has followed.

To this end FIG. 4 shows a switch comprising a cell switching unit cm to which are connected input links lec, etc and output links lsc, etc and its control unit ccm. In the latter there are shown a path processing register rtt and a routing control unit dtt, a broadcast path memory mtt and a path indicator processor unit utt.

The routing data NCV and ITR from the header of a cell arriving over the link lec (see FIG. 2) is supplied to the register rtt over a link ett and from there to the routing control unit dtt. In the case of a point-to-point call the latter selects in the indicator ITR the value corresponding to the stage in which the switch in question is located, for example the switch aa. It sends this information over the link ach to the cell switching unit cm. At the same time, the unit dtt activates the unit utt the function of which is, using a well known method, for example, to permutate the values aa through ae in the indicator ITR held in the register rtt so that the value ab takes the place of the value aa which takes that of the value ae, and so on. This enables each switch, without knowing in which stage it is located, always to take the value addressed to it from the same location in the indicator ITR. The cell switching unit cm receiving the routing data modified in this way over the link ett and routing information over the link ach modifies the received cell accordingly, then stores it and writes it to be forwarded to an output link lsc, etc designated by that routing information. Where possible, i.e. after any other cells that are waiting and have a higher priority, the cell in question, modified in this way, will be forwarded to the designated output of the FIG. 4 switch. It will be realized from the above that the complete path indicator ITR remains in the cell, so that it is possible to know the path that the cell has taken in the switching network and, to be more precise, even which of the possible path it has taken.

In the case of a broadcast call the unit dtt activates the broadcast path memory that receives the reference indicator NCV and responds by supplying routing information sent over the link ach in place of the value taken from the path indicator ITR. This data is sent at the same time to the unit utt that enters it in the values of the path indicator ITR in place of that which would have been used in the case of a point-to-point call. Apart from this difference, the routing of a cell to an output is the same as described above. If the cell must be forwarded to a second output, the unit dtt takes it from the memory mtt and repeats the operation. It is naturally possible to execute in parallel and to pool some parts of these repetitive operations to save time, using techniques known in themselves. Nevertheless, the result is that the indicator ITR of one copy of the cell in question therefore receives a value corresponding to the routing effected in the switch and that a copy of this kind will reach an output of the switching network after receiving a succession of values to complete its path indicator ITR, with the result that the latter will define the path taken by the cell in the switching network.

Accordingly, all the cells reaching the outputs of the switching network include a complete or completed path indicator ITR of this kind characterizing the path that they took in the switching network.

Figure 5:
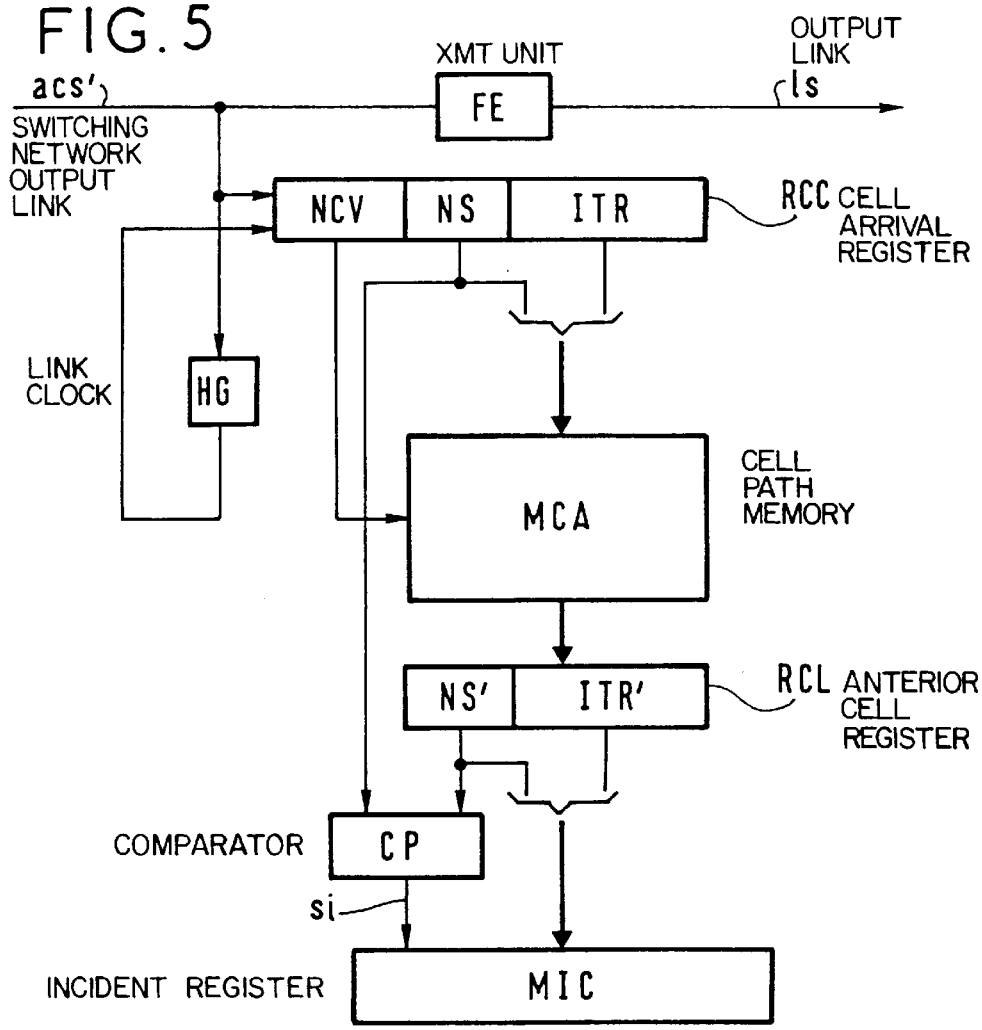
FIG. 5 shows the means provided in an output unit (uas) shown in FIG. 1 for exploiting cells as shown in FIG. 2 and for storing an incident indicator in the event of detection of a missing cell.

Turn now to FIG. 5 with reference to the means provided in an output unit as shown in FIG. 1 to exploit cells as shown in FIG. 2 and for storing an incident indication in the case of detecting a missing cell.

The means shown in FIG. 5 comprise:
- a cell arrival register RCC receiving data from the header of each cell transmitted at the switching network output to the output link ls,
- a cell path memory MCA storing data relating to the various calls set up on the link ls,
- an anterior cell register RCL in which is written the information previously stored in the memory MCA on the occasion of an earlier cell of a call, if a cell of that call is transmitted over the link ls,
- a comparator CP for detecting a missing cell,
- a memory MIC constituting an incident register,
- a link clock HG.

Each cell appearing on the link acs' that is one of the output links of the FIG. 1 switching network is transmitted to the transmission device FE that will not be described further here as it is outside the scope of the invention.

A resequencer may be inserted between the output of the switching network such as that of FIG. 1 and the link acs'. A device of this kind is described in European patent applications Nos. 0 602 281 and 0 602 282, both concerning a resequencer device for a cell switching system node. The switching network transit time is different for the various cells of the same call because of the varying waiting times in the switches passed through, as mentioned above; the function of the resequencer is to return the cells to the order of the sequence numbers.

For each of the cells transmitted over the link acs', the link clock HG pilots one operating cycle of the FIG. 5 device. It first triggers the register RCC to store the header of the cell including the routing reference indicator NCV, the sequence number NS and the path indicator ITR.

As soon as it is present in the register RCC, it is stored in the cell path memory MCA, in a location specific to the call to which the cell in question belongs, designated by an address provided by the indicator NCV.

Before this, however, the information written in the same location, on the transmission of the preceding cell of the same call, and held there until the transmission of the cell in question, is read so that it can be written into the register RCL. The sequence number NS of the cell in question and that NS' of the earlier cell are compared in the comparator CP that constitutes a detector device for detecting the absence of a cell. If the two numbers are consecutive (NS'=NS+1) everything is normal. Nothing else happens.

If the two numbers are not successive a cell is deemed to be missing. In this case the comparator CP supplies a signal si that triggers the writing into the incident memory MIC of the content of the register RCL, to which is optionally added the sequence number NS of the cell in question. The data stored essentially concerns a cell correctly routed in the FIG. 1 switching network before the cell in question. It shows where it went. As it has been shown that the successive cells of the same call take the various available paths in succession, in a given order, it is a simple matter to deduce which path the next cell of the same call should have followed. The accumulation of such data and its statistical analysis shows that the missing cells must have all passed through a particular element of the switching network, which may be assumed to be faulty. This can lead to corrective action.

If a missing cell subsequently reaches the link acs', the comparator CP will also detect it. The data stored in the incident register MIC contains the sequence number of the cell transmitted out of sequence. Interpreting the data stored in the incident register MIC shows up this particular circumstance so that this cell can be eliminated from the category of missing cells, for example.

Figure 6:
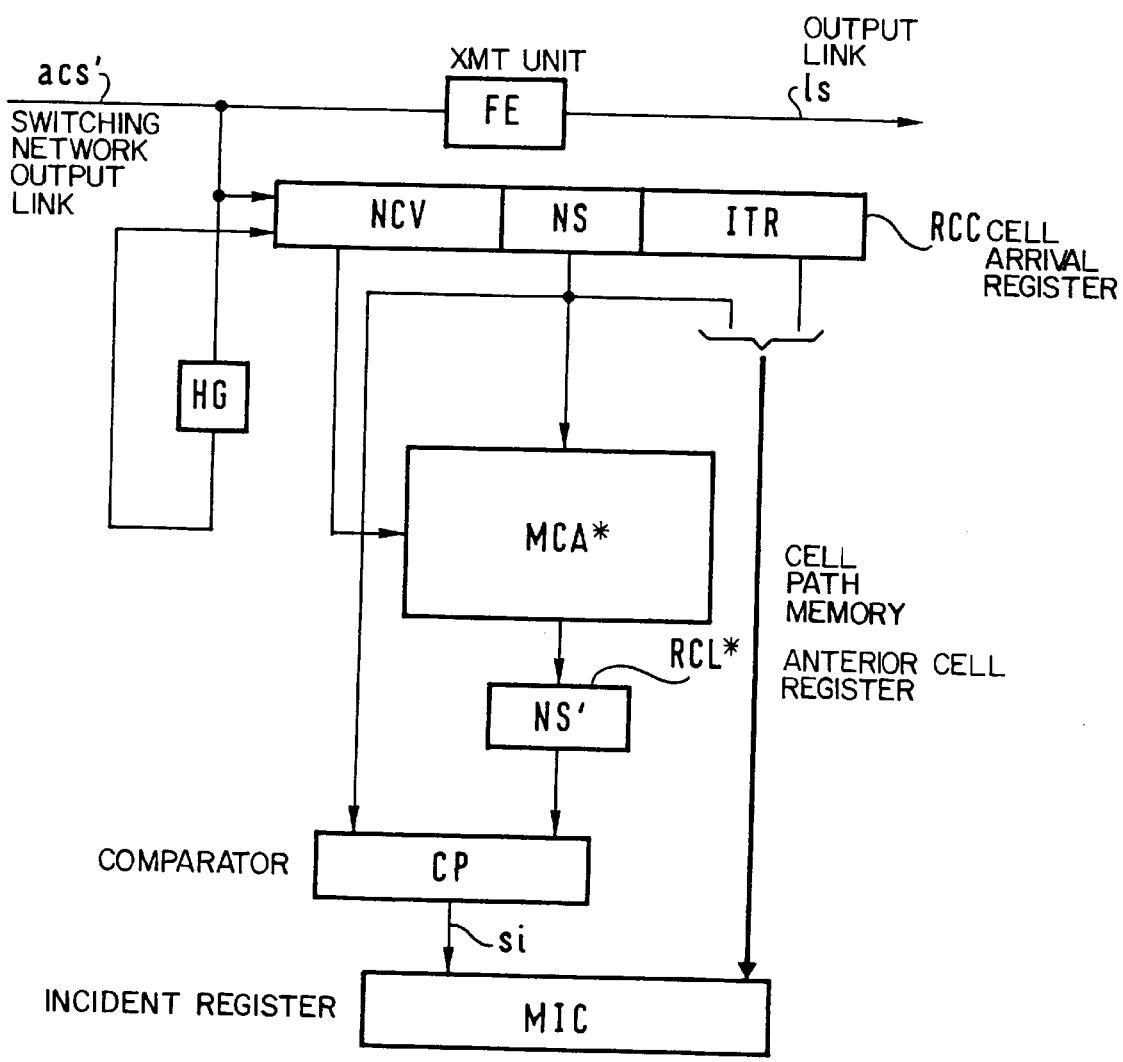
FIG. 6 shows a variant of the FIG. 5 means.

A variant of the means from FIG. 5 will now be described in outline with reference to FIG. 6. Components retained from the FIG. 5 device carry the same reference numbers and those that have been modified are marked with an asterisk.

The following are unchanged: the link acs', the transmission device FE, the link ls, the clock HG and the cell arrival register RCC. The memory MCA* is similar to the memory MCA but stores only the sequence number NS of the incoming cell. Likewise, the anterior cell register RCL* reads only the anterior sequence number NS'. The comparator CP is unchanged. The memory MCI is not modified but, in the event of a missing cell, stores the sequence number NS and the path indicator ITR of the incoming cell, instead of the path data from the memory MCA. The operation is the same as previously, except that in the event of a missing cell the path indication of the incoming cell is stored, it being assumed that the missing cell is the cell that preceded the latter, whereas in FIG. 5 the path indication of a cell transmitted previously is stored, it being assumed that the missing cell is the cell that immediately followed the preceding cell. The two solutions are equivalent in all cases where only one cell is missing.

The incident indications written into the memory MIC can be exploited in many different ways. The simplest, when the reliability of the switching network is high, is simply to monitor the level to which the memory MIC is filled. Provided that this level increases only slowing and at random, there are only sporadic faults that can be ignored. On the other hand, if the level begins to rise suddenly at a sustained rate, an alarm must be given and the content of the memory MIC must be processed statistically to determine the path taken by each missing cell. In the case of the FIG. 5 device, it is assumed that the missing cell was that immediately following the cell for which the path data has been stored. Knowing the algorithm applied by the unit BB in the input access units uae, etc of the network (FIG. 3), it is easy to define the path allocated to the missing cell. In the FIG. 6 embodiment, it is assumed that the missing cell was that immediately preceding that for which the path data has been stored. Its path can be determined just as easily. The paths of the missing cells can be expressed in the form of a series of five switch numbers, one for each stage of the switching network, which merely need to be compared. If the same number comes up endlessly in one of the stages the switch that it identifies is probably faulty. An automatic maintenance action, prior to replacement of the switch, is to modify the algorithm applied in the units BB of the input access units (FIG. 3) so as to eliminate from the possible paths at least all of the paths through that matrix.

It is obvious that the foregoing description has been given by way of example only and that many variants can be envisaged without departing from the scope of the invention as defined in the claims. In particular, the numerical values will vary from one application to another. Also, it is not necessary for the cells transmitted through the switching network to carry a sequence number (NS), an abnormally long time between successive cells also possibly indicating that a cell is missing. Likewise, comparative examination of the succession of cell path indicators can indicate that the sequence defined by the sequencing algorithm is no longer complied with, also indicating that a cell is missing.

There is claimed:

1. A switching network for switching data in the form of cells transmitted in asynchronous transfer mode as a call, wherein cells of the same call travel over multiple paths and each cell contains path data, said network comprising: detector means at each output port of said switching network to detect that a cell is missing in a call using output from that port; and incident register means for storing, in response to said detection, an incident indication signifying that a cell is missing and indicating a path, that said missing cell must have taken, from path data derived from another cell of the same call.

2. The switching network according to claim 1 wherein said path data was supplied by an earlier cell of the same call before said detection, said detector means comprising first memory means for storing said path data at the time of transmission of said earlier cell and for restoring said path data at the time of transmission of a present incoming cell in order that the restored path data constitute said path data in said incident indication.

3. The switching network according to claim 1 wherein said path data is provided by a cell of the same call available at the time of said detection and constitutes said path data in said incident indication.

4. The switching network according to claim 2, wherein consecutive cells of said call contain consecutive sequence numbers, and wherein said detector means further comprises: second memory means for storing a cell sequence number at the time of transmission of said earlier cell, and for restoring said sequence number at the time of transmission of said present incoming cell; and means for comparing said earlier cell sequence number and said present incoming cell sequence number on the assumption that a cell is missing if said sequence number of said present incoming cell is not the same as that of the earlier cell increased by a constant.

5. The switching network according to claim 4, wherein said constant is 1.

6. The switching network according to claim 1, wherein each input port of said network, comprises: sequencer means for allocating a sequence number to each cell of the same call and for inserting said sequence number in the path data of that cell; and path processor means for writing into each cell a path choice value indicating which path from said multiple paths said cell must take.

7. The switching network according to claim 1, wherein each switch of said switching network comprises means, operative when in the context of a broadcast calls, for routing an incoming cell using a broadcast path memory to supply routing data in order to enter said routing data into said path data.

8. The switching network according to claim 3, wherein consecutive cells of said call contain consecutive sequence numbers, and wherein said detector means comprises: memory means for storing a cell sequence number at the time of transmission of an earlier cell, and for restoring said sequence number at the time of transmission of a present incoming cell; and means for comparing said earlier cell sequence number and said present incoming cell sequence number on the assumption that a cell is missing if said sequence number of said present incoming cell is not the same as that of the earlier cell increased by a constant.

* * * * *